(12) United States Patent
Eickhoff

(10) Patent No.: US 9,599,997 B2
(45) Date of Patent: Mar. 21, 2017

(54) FEEDBACK-CONTROLLED FLUID VALVE

(71) Applicant: Honeywell International Inc., Morristown, NJ (US)

(72) Inventor: Steven J. Eickhoff, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 105 days.

(21) Appl. No.: 14/541,876

(22) Filed: Nov. 14, 2014

(65) Prior Publication Data
US 2016/0139608 A1    May 19, 2016

(51) Int. Cl.
F16K 31/06    (2006.01)
G05D 7/06    (2006.01)
F16K 27/02    (2006.01)
F16K 1/12    (2006.01)

(52) U.S. Cl.
CPC .......... *G05D 7/0635* (2013.01); *F16K 1/123* (2013.01); *F16K 27/029* (2013.01); *F16K 31/0651* (2013.01); *F16K 31/0658* (2013.01)

(58) Field of Classification Search
CPC ............. F16K 31/0606; F16K 31/0651; F16K 27/029; F16K 31/0658; F16K 1/123; G05D 7/0635
USPC .................................................... 251/129.21
See application file for complete search history.

(56) References Cited

U.S. PATENT DOCUMENTS

| | | | | |
|---|---|---|---|---|
| 4,649,993 A * | 3/1987 | Going, III | ............. | E21B 34/066 166/66.6 |
| 5,458,294 A * | 10/1995 | Zachary | ............. | F16K 31/0651 239/585.5 |
| 5,529,281 A * | 6/1996 | Brudnicki | ............. | F16K 1/123 251/129.03 |
| 5,794,860 A * | 8/1998 | Neumann | .......... | F02M 51/0653 239/585.3 |
| 5,848,780 A * | 12/1998 | Miller | ............. | F16K 31/0655 251/129.15 |
| 6,725,877 B2 * | 4/2004 | Liorati | ............. | F16K 31/0651 137/486 |
| 6,882,924 B2 * | 4/2005 | Miller | ............. | F02C 9/263 477/30 |
| 8,540,209 B2 * | 9/2013 | Hensel | ............. | F02C 7/232 251/129.05 |
| 8,763,631 B2 * | 7/2014 | Mares | ............. | F02C 9/263 137/220 |

* cited by examiner

*Primary Examiner* — Matthew W Jellett
(74) *Attorney, Agent, or Firm* — Brooks, Cameron & Huebsch, PLLC

(57) ABSTRACT

A feedback-controlled fluid valve and methods of using the same are described herein. One feedback-controlled fluid device includes piston within a valve associated with a conduit, a position sensor to determine a position of the piston relative to a metering cone, a coil to generate a magnetic field within the valve, wherein the magnetic field moves the piston, and wherein a rate of fluid flow through the valve is configured to adjust based on the position of the piston relative to the metering cone.

9 Claims, 3 Drawing Sheets

FEEDBACK-CONTROLLED FLUID VALVE

TECHNICAL FIELD

The present disclosure relates to a feedback-controlled fluid valve and methods of using the same.

BACKGROUND

A feedback-controlled fluid valve can be used to directly measure and control fluid flow within a hydronic system. A feedback-controlled fluid valve can be utilized in different types of devices, such as boilers, chillers, cooling towers, and radiators, among others. Such devices can be connected by various conduits of the system, such as by pipes, tubes, lines, and valves may be used to control fluid flow to or from these devices or other devices connected in conjunction with these devices.

Previous approaches for hydronic heating and cooling systems can use mechanical pressure independent valves to control flow to heating and/or cooling zones based on feedback from a thermostat. However, mechanical values may achieve poor flow accuracy and may fail to meet or maintain specifications, resulting in poor temperature control, in some implementations.

Previous approaches may additionally operate at higher nominal pressure and/or flow rate than necessary to maintain a particular temperature in the system. This can result in wasted energy and increased wear and tear on components of the system via the unnecessary additional work of pumps, chillers, and boilers, among other issues. Without flow accuracy and maintaining temperature, controlling fluid devices via feedback may be difficult under such approaches.

DETAILED DESCRIPTION

Figure 1:
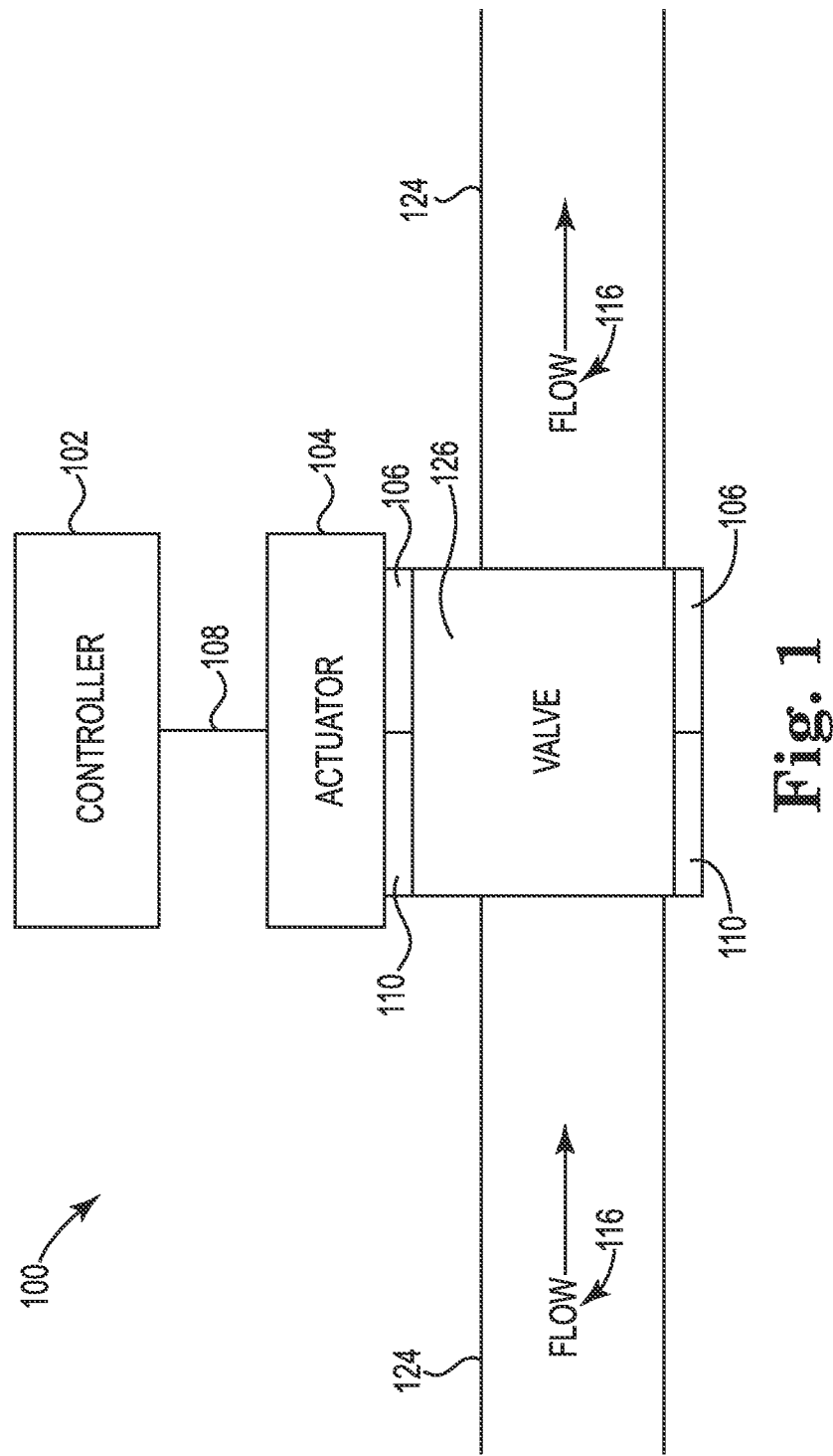
FIG. 1 illustrates an example of a feedback-controlled fluid device according to one or more embodiments of the present disclosure.

A feedback-controlled fluid valve and methods of using the same are described herein. For example, one or more embodiments include a feedback-controlled fluid valve, comprising a piston within a valve associated with a conduit, a position sensor to determine a position of the piston relative to a metering cone, a coil to generate a magnetic field within the valve, wherein the magnetic field moves the piston, and wherein a rate of fluid flow through the valve is configured to adjust based on the position of the piston relative to the metering cone.

A feedback-controlled fluid valve in accordance with embodiments of the present disclosure can control the flow of fluid through a conduit. As a result, consumption, pressure, and/or amount of fluid flowing past a valve within a period of time can be controlled.

Fluid, as used herein, generally refers to liquid or gas. Examples of fluids in accordance with embodiments of the present disclosure include liquids capable of being conducted through a conduit, such as water (e.g., fresh water, sea water, heavy water, etc.), oil(s), and/or alcohol(s) (e.g., propylene glycol, ethylene glycol, etc.), as well as solutions and/or mixtures of these and other liquid forms.

As discussed above, in various embodiments, fluid can refer to a gas (e.g., air, flue gas, steam, etc.) and/or a mixture of liquid and gas. Embodiments of the present disclosure can be utilized with any suitable conduit (e.g., pipes, tubes, lines, etc.) type, material, and/or shape.

While previous approaches for hydronic heating and/or cooling systems use mechanical pressure independent valves to control flow to heating and/or cooling zones based on feedback from a thermostat, embodiments of the present disclosure can control an amount of fluid flowing past a valve with a feedback-controlled fluid device. The feedback-controlled fluid device can increase flow accuracy, meet and/or maintain temperature specifications, and/or conserve energy, among other benefits.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of sensors" can refer to one or more sensors.

FIG. 1 illustrates an example of a feedback-controlled fluid valve according to one or more embodiments of the present disclosure. As previously discussed, a feedback-controlled fluid device 100 can utilize a valve 126 to control the rate of fluid flow 116 through a conduit 124. As shown in the example illustrated in FIG. 1, the fluid is flowing in a rightward direction indicated by an arrow within the conduit 124.

The feedback-controlled fluid device can include a one or more position sensors located externally and/or internally to the housing of valve 126. For instance, the position sensor 106 can determine a position of a piston, metering cone and/or a screw, for example, via magnetoresistive position sensors 106 mounted within and/or upon the housing of the valve 126, as will be discussed in further detail in FIGS. 2 and 3.

Valves, in accordance with one or more embodiments herein (e.g., valves having large dimensions) can be non-linear valves. That is, a relationship between a rate of fluid flow 116 through the valve 126 and different states of the valve 126 (e.g., levels of openness) can be angled and/or shaped. For example, different states of the valve 126 can influence the rate of fluid flow 116 through a linear and/or nonlinear valve 126.

As discussed above with respect to FIG. 1, in some embodiments, the feedback-controlled fluid valve can include a temperature sensor 110 to monitor fluid flow temperature. That is, the temperature of the fluid can be monitored. In some embodiments, the monitored temperature of the fluid can be used to maintain a particular temperature associated with the valve 126. For example, a valve 126 associated with a radiator can monitor the fluid flow temperature so as to maintain a particular radiator cooling temperature. In other words, monitoring the temperature of the fluid can influence the amount of cooling or heating necessary to maintain an associated temperature.

The feedback-controlled fluid device 100 can include a controller 102 that controls actuation of the valve, among other functions. As shown in FIG. 1, the controller 102 can be connected (e.g., communicatively coupled) to the actuator 104 via a link (e.g., connection, communication link) 108.

Such a connection can allow signals and/or data to be sent in any direction between the position sensors 106, the temperature sensor 110, and/or controller 102 as well as between controller 102 and actuator 104. For example, the controller 102 can cause an actuation of actuator 104 such that a state of the valve 126 is adjusted (e.g., the controller 102 can cause an actuation of the valve 126 from a first state to a second state).

Controller 102 can linearize valves throughout their operating ranges. A given state of valve 126 (e.g., characteristic, opening, position, adjustment, etc.) can be determined by plotting a measured fluid flow rate at different valve openings. For example, a given operating range can provide a particular fluid flow associated with the operating range. Comparing controller 102 output and fluid flow measurement can determine a fluid flow rate accuracy.

A linear valve characteristic can include a metering cone and/or screw from which a rate of fluid flow 116 can be directly proportional to a valve lift at a constant pressure. That is, different valve characteristics (e.g., openings) can provide different rate of fluid flow 116 for the same fluid pass area, thereby influencing a rate of fluid flow 116, as will be discussed further in FIGS. 2 and 3.

The controller 102 can function using one or more different types of technology. In some embodiments, the controller 102 can be and/or include a computing device configured to execute instructions instead of, or in addition to, logic. In such embodiments, the executable instructions can be stored in a storage location, such as flash or hard disk memory located within the controller or in an external location. For example, the controller 102 can include logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

As illustrated in FIG. 1, the controller 102 can be connected to the position sensor 106 and be coupled to actuator 104. The controller 102 can utilize these connections to control the movement of a metering cone and/or an actuating mechanism such as a screw or piston, which can influence the rate of fluid flow 116 within the conduit 124, as will be discussed further in FIGS. 2 and 3.

Figure 2:
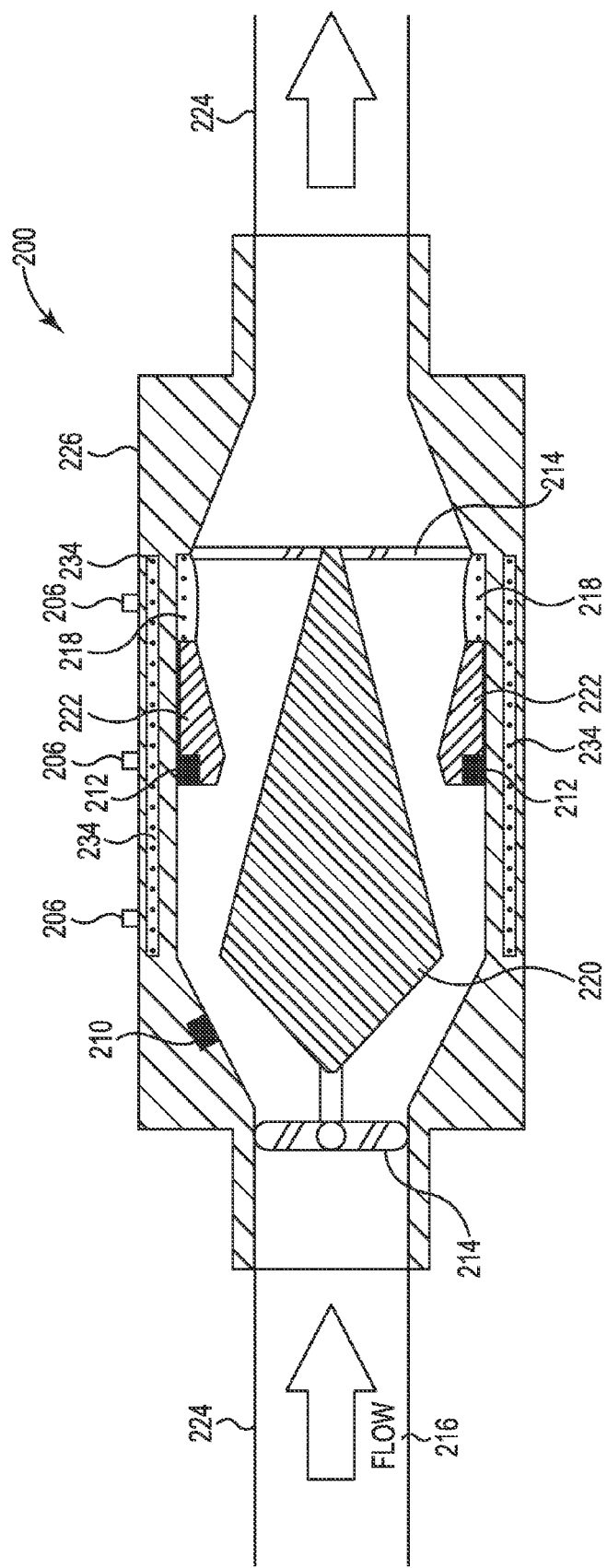
FIG. 2 illustrates an example of a feedback-controlled fluid device according to one or more embodiments of the present disclosure.

FIG. 2 illustrates an example of a feedback-controlled fluid device according to one or more embodiments of the present disclosure. A feedback-controlled fluid device 200, for example, for use in a hydronic system, as depicted in FIG. 2, can include a metering cone 220 and a piston 222 within a housing of a valve 226 associated with a conduit 224. In some embodiments, the metering cone can be fixed (e.g., static, unmoving) while a fluid flow 216 can be controlled by movement of the piston 222.

As shown in the embodiment of FIG. 2, the valve 226 can include a position sensor 206 to determine a position of a piston 222 relative to a metering cone 220. The position sensor 206 can sense magnets 212 embedded on and/or in the piston 222 as the piston 222 moves within the housing of the valve 226. The magnets 212 can include, for example, permanent magnets, annular ring magnets, single point magnetics, among other types of magnets and/or sensors.

In some embodiments, a magnetic field generated by a coil 234 can generate a force that moves the piston 222. For example, in some embodiments, the coil 234 can be wrapped around a perimeter of the housing of the valve 226 and a current can be passed through the coil 234 to generate the magnetic field. The magnetic field acts on the piston 222 and generates a force, which can be used to move the piston 222. The piston 222 can be moved by varying the strength (e.g., current) of the magnetic field generated by the coil 234.

In some embodiments, such as that shown in FIG. 2, the position sensor mechanism can include at least two magnetoresistive position sensors 206. The two magnetoresistive position sensors 206 can sense the magnetic field produced by the magnet 212 embedded on and/or in the piston 222, and/or communicate location information to pinpoint a piston 222. The two magnetoresistive position sensors 206 can provide an increased accuracy reading related to the position of the piston 222. The information can be used when positioning of the piston 222, resulting in a mechanism that can provide controlled fluid flow 216.

In some embodiments, the valve 226 can be non-ferromagnetic. A non-ferromagnetic valve and/or housing of the valve 226 can be composed of non-magnetic material. That is, the valve 226 can be non-magnetic while the piston 222 can be ferromagnetic.

Alternatively, or additionally, the piston 222 can be associated with a spring 218. The spring 218 can provide additional force and/or a buffer when adjusting the piston 222 from a first position to a second position. The spring 218 can reduce the amount of force (e.g., magnetic field strength, current) to maintain and/or change the position of the piston 222.

The movement of the piston 222 can be sensed by the position sensors 206 based on a location of the embedded magnets 212 within and/or upon the piston 222. Sensing the magnets 212 embedded within and/or upon the piston 222 can determine the position of the piston 222 relative to the metering cone 220 within the housing of the valve 226. The position sensors 206 can determine the position of the piston 222 by sensing the magnetic field produced by the embedded magnets 212 within and/or upon the piston 222.

Movement of the piston 222 can include adjusting the position of the piston 222 from a first position to a second position. Movement of the piston 222 can include linear movement and/or movement along the valve housing 226 wall. The movement of the piston 222 can adjust the position of the piston from a first end of the valve housing 226 to a second end of the valve housing 226. In this manner, the position of the piston 222 can be adjusted to change a rate of fluid flow 216. For example, a feedback-controlled fluid device 200 coupled to a radiator can adjust the piston 222 relative to the metering cone 220 within the valve 226 to increase a rate of fluid flow 216, thereby increasing the amount of fluid flowing within the conduit 224.

Based on the position of the piston 222 relative to the metering cone 220, the rate of fluid flow 216 can be adjusted. The fluid flow 216 can flow around the metering cone 220 and through the conduit 224. Additionally, or alternatively the fluid flow 216 can move between the metering cone 220 and the piston 222. The amount of fluid flowing around and/or between the metering cone 220 and/or piston 222 can influence the rate of fluid flow 216. That is, when the piston 222 is adjusted to a position closer to the metering cone 220, the positioning of the piston 222 relative to the metering cone 220 can produce a reduced rate of fluid flow 216. Alternatively, when the piston 222 is adjusted to a position away from the metering cone 220, the positioning relative to the metering cone 220 can produce an increase rate of fluid flow 216.

In some embodiments, the piston 222 relative to the metering cone 220 can set a rate of fluid flow 216. A set rate of fluid flow 216 can provide a continuous, constant stream of fluid through the conduit. That is, the position of the piston 222 can be positioned such that a fluid flow 216 can move through the valve and into the conduit 224 downstream at a particular rate. In some embodiments, setting the rate of fluid flow 216 can include orifices, flow regulators, bypass flow regulators, demand-compensated flow control valves, pressure-compensated variable flow valves, pressure and temperature compensated flow valves, among others.

Controlling the position of the piston 222 can control the rate of fluid flow 216 through a valve 226 and the associated conduit 224. A rate of fluid flow 216 through the valve 226 can be configured to be adjusted based on the position of the piston 222. In this way, the piston 222 can be positioned in such a manner to increase or decrease a flow from a grate 214 located upstream from a conduit to downstream a conduit 224.

A temperature sensor 210 can be mounted within the valve housing 226, in some embodiments. The temperature sensor can monitor the rate of fluid flow 216 temperature. The rate of fluid flow 216 can be determined by the position of the piston 222, the current in response to the magnetic field generated by the coil, and/or the temperature of the fluid. Aspects of the temperature sensors will be discussed in further detail in FIG. 3.

In some embodiments, the feedback-controlled fluid device 200 can include one or a combination of position sensors 206, one or more temperature sensors 210, and/or a magnetic field (e.g., coil) from which the rate of fluid flow 216 can be controlled in part by the position of the metering cone 204, temperature of the fluid 216, and/or the magnetic field generated within the valve 226.

Figure 3:
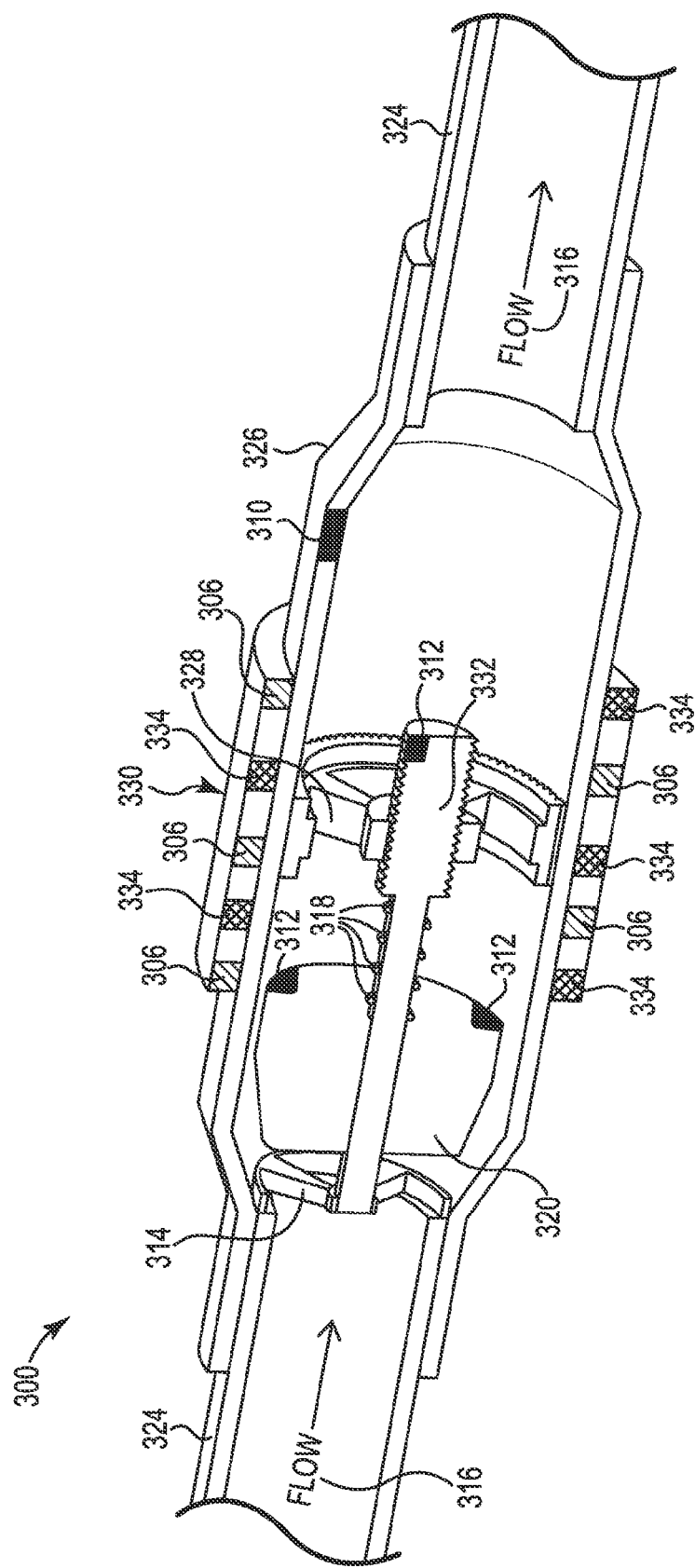
FIG. 3 illustrates an example of a feedback-controlled fluid device according to one or more embodiments of the present disclosure.

FIG. 3 illustrates an example of a feedback-controlled fluid device according to one or more embodiments of the present disclosure. A feedback-controlled fluid device 300, as depicted in FIG. 3, can include a number of position sensors 306 that can determine a position of a screw 332 and a metering cone 320 within a non-ferromagnetic valve 326 associated with a conduit 324. A screw, as used herein, can be a lead screw, power screw, translation screw, among others screws that provide a sliding ability.

A coil 334, as discussed in association with FIG. 2, can be used to generate a magnetic field by passing a current through the coil 334 wrapped around the perimeter of the housing 330 of the valve 326. The coil 334, in some embodiments, can be a stator coil 334. The stator coil 334 can be associated with a stepper motor rotor 328, which can drive the screw 332 linearly along the axis of the valve 326. The screw 332 can be coupled to a metering cone 320 via a spring 318. Movement of the screw 332 can move the metering cone 320 forward and/or backward, which can open and/or close the valve 326. The position of the metering cone 320 can determine the rate of fluid flow 316 through the conduit 324 downstream.

In a number of embodiments, the feedback-controlled fluid device 300 can determine a position of the metering cone 320 and the screw 332 based on embedded magnets 312 within/and or upon the metering cone 320 and/or the screw 332. The position sensors 306 can sense (e.g., detect) the position of the magnets 312 embedded within/and or upon the metering cone 320 and/or the screw 332. The position sensors 306 can determine the position of the metering cone 320 and/or screw 332 by sensing the magnetic field produced by the embedded magnets 212 within and/or upon the metering cone 320 and/or screw 332 within the valve 326.

The spring 318 associated with the screw 332 can be coupled to the metering cone 320. For example, the screw 332 can be used to control the fluid flow 316 rate through a conduit 324 and the screw 332 can have a spring 318 connected thereto. The spring 318 can be used to assist in controlling the metering cone 320 by providing a force to push the metering cone 320 into a particular position. In some instances, the spring 318 can provide a force that allows the spring to act as a buffer between the screw 332 and the metering cone 320, thereby establishing a layer of protection and/or prevent damage between the screw 332 and the metering cone 320.

In some embodiments, a controller, as previously discussed with respect to the embodiment illustrated in FIG. 1, can be coupled to an actuator and connected to one of the position sensors 306. An actuator can be a motor, such as a stepper motor rotor 328 and a stator coil 334, that can move and control the screw 332 within the valve 326. In some embodiments, the actuator can be operated by an energy source, such as hydraulic fluid pressure, electric current, and/or pneumatic pressure. The metering cone 320 and/or screw 332 can be actuated via a stepper motor rotor 328 and stator coils 334 within the valve.

Actuation of the screw 332 by a stepper motor rotor 328, can create a rate of fluid flow 316 through the valve 326 that is controlled by the position of the screw 332 and metering cone 320. That is, the position of the screw 332 and metering cone 330 can determine the position of an associated metering cone 320, which can control the influx of fluid flow 316 and rate. The metering cone 320 can move relative to the grate 314, which can control the rate of fluid flow 316. The rate of fluid flow can cease when the metering cone 320 is against the grate 314. Alternatively, the rate of fluid flow 316 can increase as the distance between the grate 314 and the metering cone 320 increases.

In some embodiments, the rate of fluid flow 316 is compared to a threshold fluid flow target. The fluid flow target can be a range of fluid intervals that are acceptable within a given scenario. For example, a radiator may have a fluid flow target (e.g., range), which can maintain a particular temperature (e.g., heating/cooling) based on the fluid flow 316. The fluid flow 316 can fall within the fluid flow target to maintain the particular temperature (e.g., heating/cooling) in the given scenario.

As shown in the embodiment of FIG. 3, a temperature sensor 310 can monitor fluid flow temperature within the valve 326. Monitoring the temperature of the fluid can be performed by a temperature sensor that is in thermal communication with the fluid. In some embodiments, one or more temperature sensors 310 can be in direct contact with the fluid flow 316. For example, the temperature sensor 310 can be embedded within the internal housing of the valve 326, thereby establishing direct contact with the fluid flow 316.

Additionally, or alternatively, a temperature sensor 310 can be in non-direct contact with the fluid flow 316. In some embodiments, the temperature monitoring can be performed by a temperature sensor 310 located externally from the valve. That is, the temperature sensor 310 can be located such that the fluid flow 316 can be in non-direct contact with the temperature sensor 310. Although the temperature sensor can be in non-direct contact with the fluid flow, the temperature sensor can be in thermal communication with the fluid. For instance, the temperature of a fluid flow 316 within the valve 326 can be monitored by one or more external temperature sensors 310 embedded upon the housing of the valve 326, thereby establishing non-direct contact with the fluid flow 316.

In some embodiments, controlling the rate of fluid flow 316 by generating a magnetic field within the conduit 324, as previously discussed, can include a non-ferromagnetic conduit 324 that can be symmetrical. That is, the non-ferromagnetic conduit can, in some examples, appear symmetrical when viewed sectionally.

A rate of fluid flow 316 through the valve 326 can be controlled based on the position of the metering cone 320 and/or screw 332. That is, the detected position of the magnets embedded within/and or upon the metering cone 320 and/or screw 332 can determine the influx for fluid into valve 326 and flow into the conduit 324. The rate of fluid flow can, in some embodiments, be controlled based on the measured positions of the lead screw 332, the metering cone 320, and/or the fluid temperature 310. Based on the respective position(s), the rate of fluid flow 316 can be controlled and/or adjusted.

In some embodiments, controlling the rate of fluid flow can include completely sealing the fluid flow 316. For example, a boiler may no longer need an influx of fluid flow. The metering cone 320 can be positioned against the grate 314, such that the fluid flow 316 ceases. For example, the entry into the conduit 324 downstream can be sealed via the metering cone 320. For instance, the screw 332 can position the metering cone 320 at the grate 314 opening of the conduit 324 upstream. Positioning of the metering cone 320 at the grate 314 opening of the conduit 324 upstream can seal the opening into the valve 326, resulting in a cease of fluid influx. The metering cone 320 can effectively seal the opening to prevent fluid flow 316 intake.

As discussed herein, embodiments of the present disclosure can control an amount of fluid flowing past a valve with a feedback-controlled fluid device. The feedback-controlled fluid device can measure and/or control fluid flow at the same time, without a separate flow sensor. The feedback-controlled fluid device can increase flow accuracy, meet and/or maintain temperature specifications based on the fluid flow, increase and/or decrease fluid flow as desired, and/or conserve energy, among other advantages.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above valves and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A feedback-controlled fluid valve device, comprising:
   a piston within a valve associated with a conduit, the piston having a magnet provided thereon;
   a position sensor to determine a position of the piston relative to a metering cone based upon sensing the position of the magnet on the piston relative to the metering cone;
   a coil to generate a magnetic field within the valve, wherein the magnetic field moves the piston; and
   wherein a controller adjusts a rate of fluid flow through the valve and wherein the rate of fluid flow is variably adjusted in response to the movement of the piston in response to the magnetic field generated by the coil and wherein the amount of adjustment is based on the position of the piston relative to the metering cone.

2. The valve of claim 1, wherein movement of the piston is varied based on the magnetic field generated by the current running through the coil.

3. The valve of claim 1, wherein the piston includes one or more embedded magnets.

4. The valve of claim 3, wherein the position sensor can be coupled to a controller and determines the position of the piston based on a magnetic field produced by the embedded magnets.

5. The valve of claim 1, further comprising a spring that can provide additional force and a buffer when adjusting the piston, wherein the spring reduces an amount of current used to maintain the position of the piston relative to the metering cone.

6. The valve of claim 1, wherein the rate of fluid flow is determined based on the position of the piston, temperature of the rate of fluid flow, and a current in response to the magnetic field generated by the coil.

7. The valve of claim 1, wherein the rate of fluid flow is controlled based on the position of the piston relative to the metering cone.

8. The valve of claim 1, wherein the position sensor includes at least two magnetoresistive position sensors.

9. The valve of claim 1, further comprising a temperature sensor to monitor fluid temperature.

* * * * *